May 24, 1932.　　　J. J. TATUM　　　1,859,808

VEHICLE SPRING

Filed Oct. 7, 1930

Inventor
John J. Tatum,

By Edwin S. Clarkson
Attorney

Patented May 24, 1932

1,859,808

UNITED STATES PATENT OFFICE

JOHN J. TATUM, OF BALTIMORE, MARYLAND

VEHICLE SPRING

Application filed October 7, 1930. Serial No. 487,058.

This invention relates to improvements in elliptical and semi-elliptical springs for railway cars and automobile pleasure cars and trucks and other similar vehicles, and has special reference to springs of that type in which an antifriction bearing and an associated cushioning bearing of rubber or like resilient material are employed for each end of the spring for the purpose of securing a cushioning action comparable to what is known by automobile builders as balloon tire cushioning.

The object of the invention is to provide a novel and improved construction of antifriction and cushioning and bearing means for free-end elliptical and semi-elliptical cushioning spring structures which ensures a free and easy movement of the free spring ends and a soft, resilient cushioning action of the spring, whereby a highly flexible and easy riding spring which is of maximum smoothness and quietness in its performance is produced.

A further object of the invention is to provide a construction which allows ready and convenient replacement of the bearing parts when damaged or worn.

Figure 1:
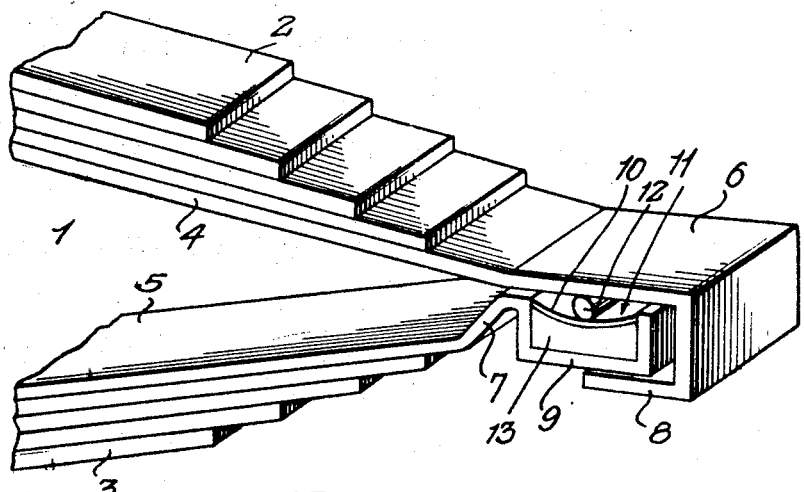
Figure 2:
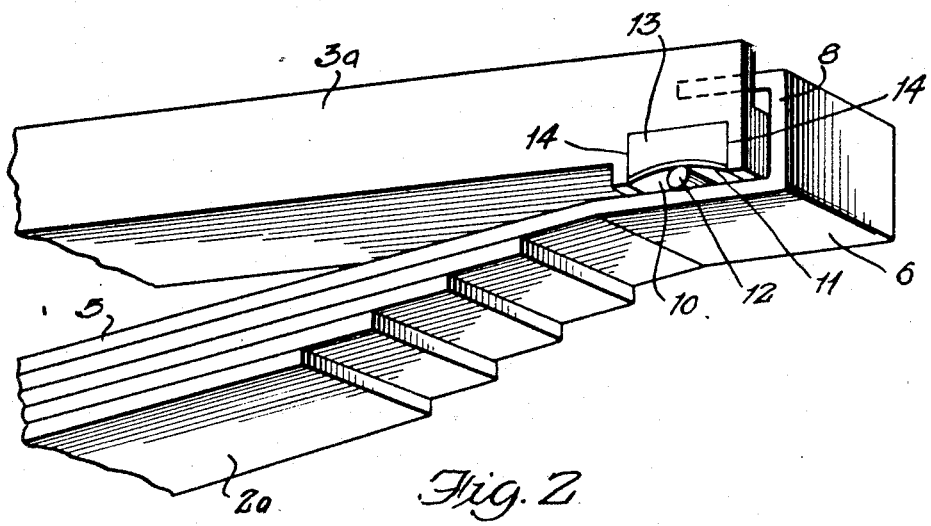

With these and other objects in view, the invention consists of the features of construction, combination and arrangement of parts hereinafter fully described and claimed, reference being had to the accompanying drawings in which:

Figure 1 is a perspective view of one half of my improved elliptical spring, parts being in section; and Figure 2 is a similar view of a semi-elliptical spring embodying my invention as adapted for use on an autovehicle.

Referring now more particularly to the drawings, and with special reference to Figure 1, 1 designates an elliptical cushioning spring structure constructed in accordance with my invention and comprising an upper main spring member 2 and a lower main spring member 3, each formed of a plurality of superposed spring leaves. As shown, the opposed relatively inner leaves 4 and 5 of these spring members 2 and 3 have loosely coupled free end portions 6 and 7 which are respectively bent or shaped to form a horizontally disposed U-shaped bearing housing 8, and a vertically disposed U-shaped bearing box or chamber 9. The box or chamber 9 fits sufficiently loose in the housing 8 to rock and slide therein in the relative vertical play of the spring ends, and said box or chamber 9 is adapted to slide horizontally with freedom in the housing 8 in the cushioning motions of the spring members.

Disposed within the box or chamber 9 is a longitudinally extending bearing plate 10, of thin steel or other suitable durable metal. This plate is of concavo-convex form or otherwise constructed to provide an upper concaved bearing face 11 on which freely rides an antifriction bearing ball or roller 12 exposed through the open top of the bearing box and disposed between said plate and the upper horizontal wall of the housing 8. The ball or roller forms a shifting pivotal axis on which the engaged ends of the spring members may relatively rock or tilt, and said ball or roller also provides a shifting antifriction bearing which ensures a free and easy sliding motion of the bearing box 9 in its housing 8.

It will be evident, of course, that the bearing plate element of the box forms with the superposed part of the housing a raceway for the ball or roller, which may be of suitable type for coaction with either a ball or a roller bearing. Also in practice, one or more balls or rollers may be used in each bearing.

Within the box or chamber 9 is also arranged a cushioning bearing block 13 of rubber or other elastic or resilient material having a concaved outer face on which the bearing plate 10 is seated, and to which said plate may be suitably secured. This block 13 is of somewhat less depth than the bearing box and of a length such that when it is inserted it will be held under compression between the end walls 14 of the box. In practice the block may be detachably secured in the box in any preferred manner, as by the use of fastening devices or by properly flanging or otherwise constructiong the box or housing to provide retaining means to hold the block from casual displacement.

In operation, the spring structure may be employed as a rubber cushion, roller or ball bearing raceway, free-end, elliptic cushioning spring structure for railroad cars, motor cars or trucks which allows pivotal as well as relative sliding motions of the spring ends in the bowing of the spring members, and also an elastic support of the spring ends. This ensures a free action of the spring in all its movements and a soft, resilient cushioning action by the use of the rubber, as well as quietness in the performance of the spring due to the damping action of the rubber, giving the equivalent of balloon tire cushioning.

Figure 2 shows the embodiment of the invention in a semi-elliptic form of cushioning spring structure and its application to the chassis frame of a motor car or like vehicle. In this embodiment 2ª represents the multiple leaf spring member and 3ª a motor frame member which here constitutes a non-resilient, complemental member or part of the spring structure. The member 2ª is here shown as having the free end portion 6ª formed to provide the housing 8, while the member 3ª has a part formed to provide the bearing box or chamber 9 containing the bearing and cushioning means hereinbefore described and as shown in Figure 1. The operation with this construction will be obvious from the foregoing description.

While I have described specific constructions for the purpose of disclosing my invention, it will, of course, be understood that I do not limit myself to the same, as other forms of construction may be employed without departing from the inventive thought and the scope of the appended claims.

What I claim:

1. In an elliptical vehicle spring, opposed spring members having inner leaves provided with free ends, the free end of the inner leaf of one member being formed to provide a bearing chamber and the free end of the inner leaf of the other member being formed to provide a housing slidably and pivotally receiving said bearing chamber, and antifriction bearing and cushioning means in said chamber and between the same and a portion of the housing.

2. In an elliptical vehicle spring, opposed spring members having leaves provided with free ends, one shaped to form an integral bearing chamber and the other to form an integral housing in which said bearing chamber is slidably and pivotally received, and antifriction bearing and cushioning means in said chamber and between the same and a portion of the housing.

3. In an elliptical spring, opposed spring members having leaves provided with free ends, one shaped to form a U-shaped bearing chamber and the other shaped to form a U-shaped housing slidably and pivotally receiving said bearing chamber, and antifriction bearing and cushioning means in said chamber and between the same and a portion of the housing.

4. In an elliptical vehicle spring, opposed spring members having leaves provided with free ends, one formed to provide a bearing chamber and the other a housing in which said bearing chamber is slidably and pivotally received, a stationary cushioned bearing member in said chamber, and a movable antifriction bearing member in said chamber and between the same and a portion of the housing.

5. In an elliptical vehicle spring, opposed spring members having leaves provided with free ends, one bent upon itself to form an integral bearing chamber and the other bent upon itself to form an integral housing in which said bearing chamber is slidably and pivotally received, a stationary cushioned bearing member in said chamber, and a movable antifriction bearing member in said chamber and between the same and a portion of the housing.

6. In an elliptical vehicle spring, opposed spring members having leaves provided with free ends, one bent upon itself to form a U-shaped bearing chamber and the other bent upon itself to form a U-shaped housing slidably and pivotally receiving said bearing chamber, a stationary cushioned bearing member in said chamber, and a movable antifriction bearing member in said chamber and between the same and a portion of the housing.

7. In an elliptical vehicle spring, opposed spring members having their opposed leaves provided with free ends, one bent upon itself in a direction at right angles to its plane to provide a vertically disposed bearing chamber and the other bent backwardly upon itself to provide a horizontal housing in which said bearing chamber is slidably and pivotally received, a stationary bearing plate in the bearing chamber, a rubber cushion backing said bearing plate, and a movable antifriction bearing member between the bearing plate and a portion of the housing.

8. In a vehicle spring structure, opposed members having free ends, one shaped to form an integral bearing chamber and the other to form an integral housing in which said bearing chamber is slidably and pivotally received, a bearing plate in the bearing chamber, a rubber cushion seated in the bearing chamber and backing said bearing plate, and a movable antifriction bearing member between the bearing plate and a portion of the housing.

9. In a vehicle spring structure, opposed members having free ends, one shaped to form a U-shaped vertically disposed bearing chamber integral therewith and the other shaped to form a U-shaped horizontally disposed housing integral therewith and slidably and pivotally receiving said bearing chamber, a bearing plate in the bearing chamber, a rubber cushion seated in the bearing chamber and backing said bearing plate, and a movable antifriction bearing member between the bearing plate and a portion of the housing.

10. In a vehicle spring structure, opposed members having free ends, one having a bearing chamber and the other a housing, in which said bearing chamber is movably received, a bearing plate in the bearing chamber, a block of cushioning and sound and vibration damping material seated in the housing backing said bearing plate, and a movable antifriction bearing member between the bearing plate and the housing.

11. A vehicle spring structure comprising a pair of relatively movable members having free end portions, the free end portion of one member having a bearing chamber and the free end portion of the other member having a housing loosely receiving said chamber, a block of elastic cushioning and sound and vibration damping material fitted under retaining compression in said bearing chamber, a thin metal wear plate fixed to and backed by said block, and a movable antifriction bearing member in said chamber and disposed between said wear plate and the housing.

12. In a vehicle spring, a frame member having an end portion provided in its underside with a bearing chamber, a multiple leaf spring having a leaf thereof provided with an end portion bent back upon itself in U-form to provide a housing having a bearing surface and loosely receiving said bearing chamber, a block of elastic cushioning and sound and vibration damping material fitted under retaining compression in said bearing chamber, a thin metal wear plate secured to said block, and a movable anti-friction bearing member in said chamber and disposed betweeen said wear plate and the housing.

In testimony whereof I affix my signature.

JOHN J. TATUM.